United States Patent Office 2,887,889
Patented May 26, 1959

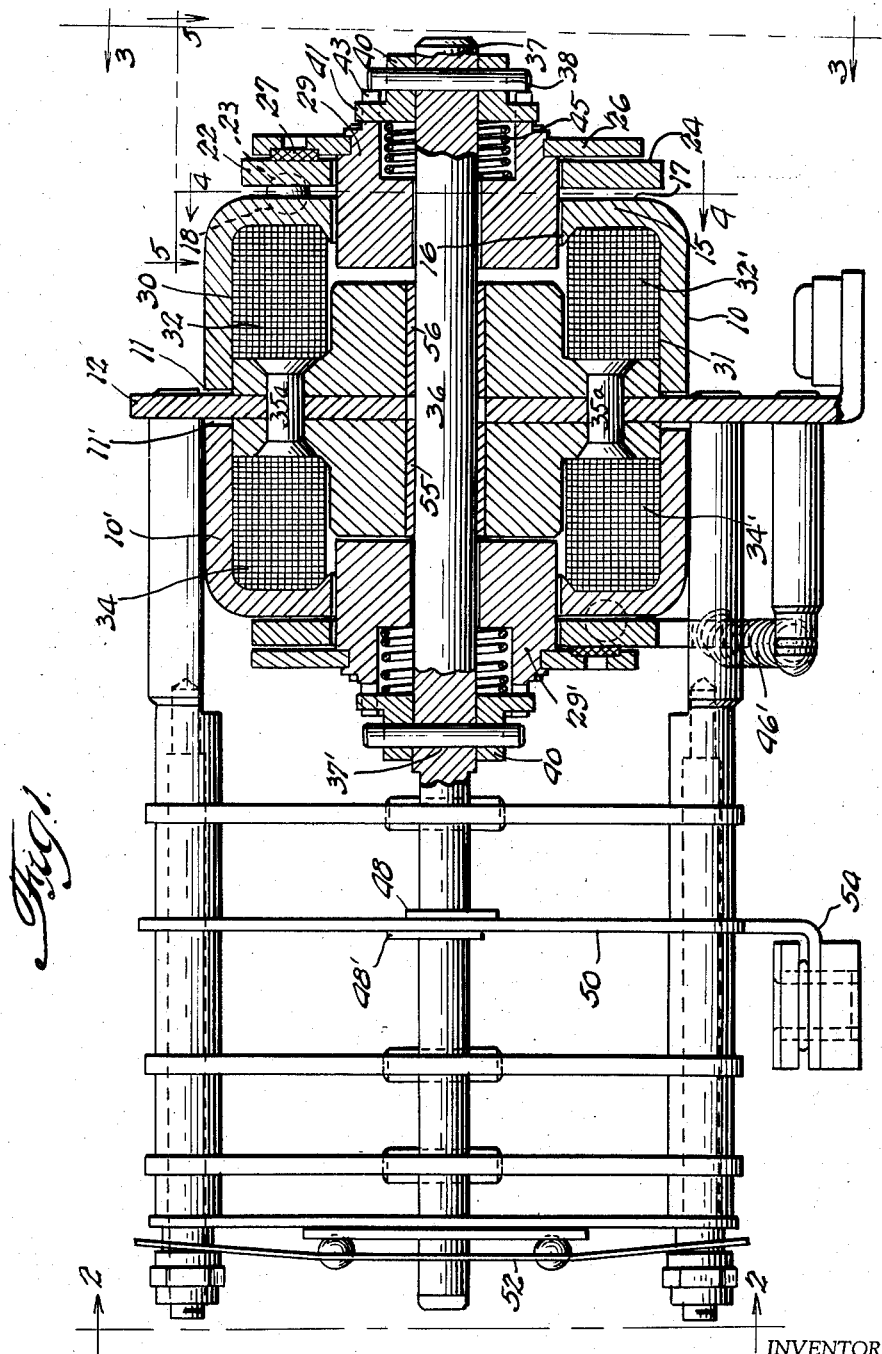

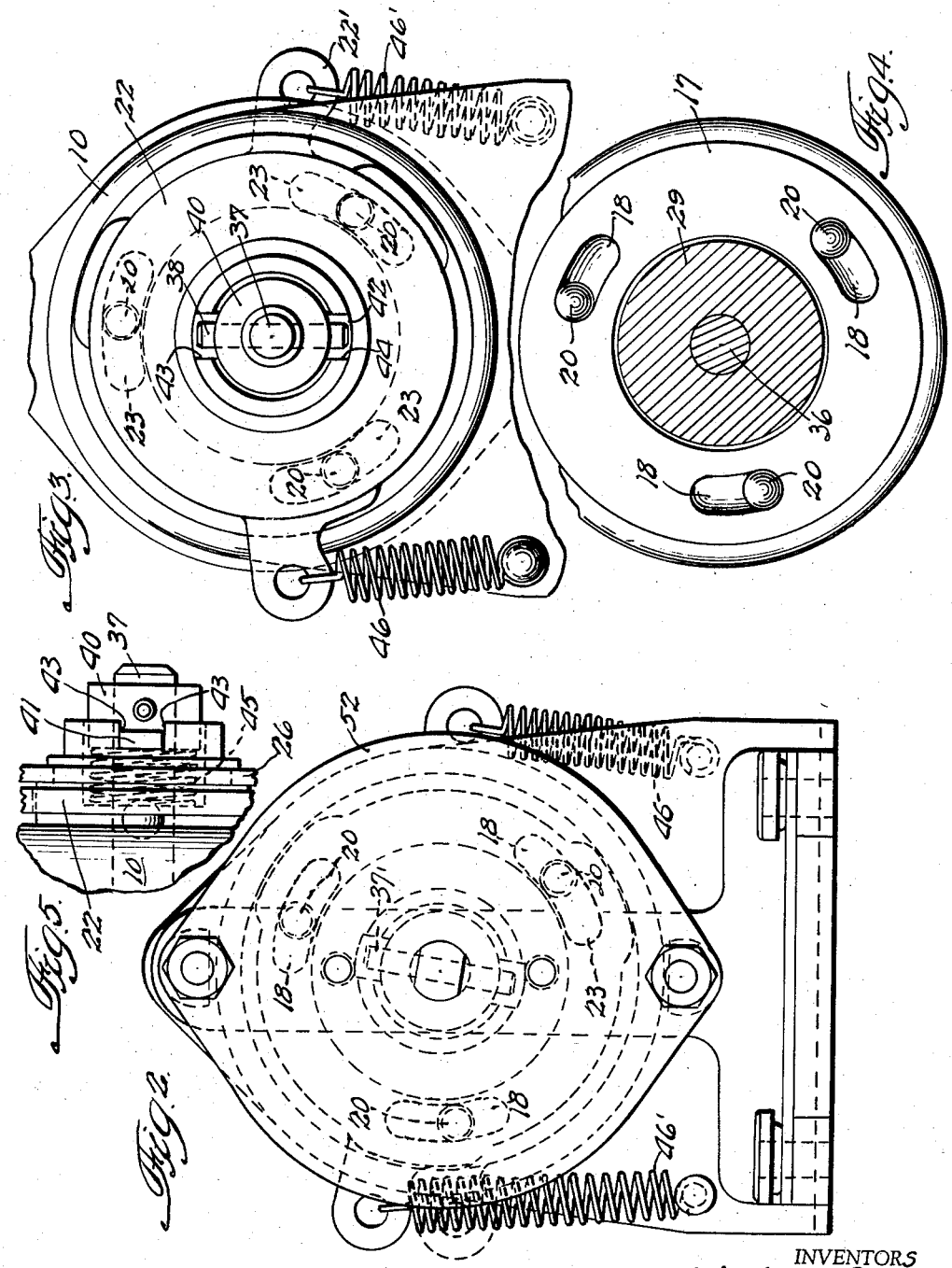

2,887,889

ROTARY SOLENOID

Wilbert Parisoe, Highland Park, and James A. Dolesh, Chicago, Ill., assignors to Oak Mfg. Co., Chicago, Ill., a corporation of Illinois Application April 1, 1957, Serial No. 650,019

4 Claims. (Cl. 74—99)

This invention relates to a rotary solenoid and more particularly to a solenoid which may operate through a predetermined angular range in either direction of rotation. The rotary solenoid embodying the present invention may be used to actuate switches, mechanical devices and the like.

A structure embodying the present invention utilizes two rotary solenoids, said solenoids being modified so that they may be combined into a single unitary device. In order that the invention may be understood an exemplary embodiment will be disclosed and described. The embodiment is illustrative of the invention and variations may be made without departing from the invention as defined by the appended claims.

Figure 1 is a side view in section of the new rotary solenoid, this view also showing a side view of a rotary switch load for the solenoid.

Figure 2 is an end view from line 2—2 of Figure 1.

Figure 3 is an end view from line 3—3 of Figure 1.

Figure 4 is a section along line 4—4 of Figure 1.

Figure 5 is a detail of the clutch portion of the new solenoid.

The rotary solenoid embodying the present invention is based upon a rotary solenoid construction disclosed in the United States Patent No. 2,496,880 to G. H. Leland issued on February 7, 1950. The rotary solenoid disclosed in said patent generally involves an armature which is attracted during relay energization and which during attraction is caused to turn about an axis.

Referring to the drawings, the relay comprises two constructions which are generally images of each other and which may conveniently be described by describing the various parts in pairs. Each solenoid portion consists of generally cup-shaped ferromagnetic portions 10 and 10' having opposing edges 11 and 11' spaced from each other. Between the opposed cups is plate 12.

Cup member 10 has bottom portion 15 terminating in annular pole piece 16. Bottom portion 15 of cup 10 has outer face 17 provided with arcuate tracks 18 whose depths into bottom portion 15 varies to form a circularly inclined track. Thus for example in Figure 4, tracks 18 may go deeper into the metal with counterclockwise travel along the track around the center of member 15. As illustrated here, member 15 is provided with three tracks 18, each track containing ball bearing 20.

Cooperating with ball bearings 20 is rotatable plate 22 containing three tracks 23 which are the images of tracks 18 in so far as the inclination of track depth is concerned. In other words, as illustrated in Figure 3, tracks 23 extend deeper into plate 22 (come up from the plane of the paper) with clockwise rotation.

As more fully disclosed in said Leland patent, upon solenoid operation, the arcuate tracks and ball bearings cooperate to permit plate 22 to turn and approach face 17 of the cup-shaped member. The angular extent of the tracks and the inclination of the tracks determine the range of angular movement of plate 22 and the amount of longitudinal displacement of the plate. The action above described is in some respects similar to a nut on a screw thread.

Plate 22 is in the form of a ring and has outer face 24 cooperating with annular driving member 26. Driving member 26 is adapted to frictionally engage surface 24 of plate 22 to provide a clutch action. For increasing friction, driving plate 26 is provided with a plurality of friction plugs 27 set into suitable recesses in plate 26.

Driving plate 26 is rigidly secured to cylindrical armature 29 of ferro-magnetic material. Armature 29 has a reduced end disposed within plate 22. Armature 29 has active pole face 30 adapted to cooperate with opposed pole face 31 of magnetizing field structure 32. Part 32 is shaped so that magnetizing winding 32' may be disposed within cup 10 and around part 32. It is understood that parts 32 and 32' are of soft iron or soft steel. Magnetic parts 32 and 32' have flange portions 35 and 35' on opposite sides of plate 12. Rivets 35a extend through registering apertures in the flanges and plate to retain the same assembled. Cups 10 and 10' may be press fitted over flanges 35 and 35'.

Loosely passing through armature 29 and portion 32 is shaft 36. Shaft 36 has end portion 37 passing beyond the end of armature 29. Portion 37 of the shaft has transverse pin 38 passing through the same, pin 38 coupling the shaft to driving sleeve 40. Driving sleeve 40 has radially extending fingers 41 and 42 which cooperate with slots 43 and 44 formed on the outer end of armature 29. Disposed within a recess of armature 29 is coil spring 45, which acts against fixed sleeve 40 and movable armature 29 and serves to keep friction plugs 27 pressed against face 24 of plate 22. Coil spring 45 also serves to keep the ball tracks or races 18 and 23 and balls 20 biased to a proper angular position.

Corresponding portions of the entire construction are similar, similar parts bearing primed numbers. Shaft 36 has portion 37' cooperating with corresponding driving sleeve 40'.

As shown in Figures 2 and 3, plates 22 and 22' are respectively biased by coil springs 46 and 46' engaging ears on the two plates, the coil springs being anchored to studs on stationary portions of the rotary solenoid.

Shaft 36 is mounted to have a little longitudinal play. As illustrated here, shaft 36 has two C-rings 48 and 48' set in annular grooves in the shaft. The C-rings are on opposite sides of strap 50 supported by studs carried by plate 12.

The two windings are connected so that each winding may be selectively energized. Let it be assumed that winding 34' has been energized. Armature 29' will be attracted inwardly toward face 31'. The longitudinal force on armature 29' will force driving plate 26' tightly against plate 22' and thus increase the friction between the two to provide a clutch action. Plate 22' is turned in one direction and due to the action of the ball bearings and inclined surfaces, armature 29' will turn as it moves to the right as seen in Figure 1.

Since there is no attraction involving armature 29, there will be little clutch action at the right half of the construction. Shaft 36 will be moved longitudinally to the right a small distance. The little clutch action present will be due to spring 45. Thus driving plate 26 can turn generally free with respect to plate 22, this turning being in a direction opposite to the travel when winding 34 is energized.

De-energization of winding 34' will result in plate 22' returning to a normal position. This is due to the action of coil spring 46' in this particular instance.

The load may consist of a number of switches such as are suggested to the left of Figure 1 together with suitable index means 52. An example of such a switch and index means is described in United States Patent No. 2,186,949.

The entire solenoid may be mounted in any suitable fashion. Thus plate 12 and strap 50 may carry mounting feet 53 and 54 for securing the construction to a suitable base. In order to provide suitable support for shaft 36, sleeves 55 and 56 within the two magnetic core portions may be provided. These sleeves are dimensioned to provide a snug fit for shaft 36 and permit the shaft to turn and move smoothly and also to adjust itself longitudinally.

Ample clearance between the shaft and each armature is provided so that each armature can move longitudinally of the shaft as it rotates. The coupling between the shaft and armatures by way of fingers 41 and 42 and slots 43 and 44 is of such a nature as to provide rotative coupling therebetween to permit relative longitudinal movement of each armature with respect to the shaft.

The clearance between the opposing faces of the armature and magnetic core for each driving unit is sufficient so that in the position of an armature illustrated in Figure 1, this showing the left hand armature in the attracted position, there will still be an air gap.

It is desirable however to dimension the structure so that the opposing pole faces are as close together as possible in the normal position of an armature without permitting physical contact between the ferro-magnetic surfaces in the attracted position. This will permit maximum magnetic force to be created in the beginning of a stroke while preventing sticking at the end of a stroke.

It is also desirable to have minimum air gaps between the outer surfaces of each armature and the opposed surfaces of the bottom of each cup member. As is clearly shown in Figure 1, the opposed surface of the metal at each cup cooperating with the cylindrical surface of an armature is increased axially by suitable shaping of the metal. Thus the magnetic properties of the structure are improved.

What is claimed is:

1. A rotary solenoid construction for providing a predetermined angular movement from a normal rest position in one direction or reverse direction, said construction comprising a pair of rotary solenoids, each solenoid having a magnetic field structure including a magnetizing winding, each solenoid including an armature, a driving member rigidly secured to each armature, means for each solenoid including a driven member for guiding the armature to move in a helical path, means for securing said solenoids so that said armatures have their helical travel paths coaxial, one armature being adapted to turn in one direction and the other armature being adapted to turn in the opposite direction upon solenoid energization, means for mounting the driving and driven members so that when an armature moves because of the energization of its corresponding magnetic field structure said armature tends to force the driving member against the driven member, friction means for providing a clutch action between said driving member and its driven member, a shaft passing through both armatures, means for coupling said shaft to each driving member for rotation, said last named means permitting each driving member to move longitudinally with respect to the shaft and means for biasing each driven member to a normal rest position.

2. A rotary solenoid construction for providing a predetermined angular movement in one direction or reverse direction from a normal rest position, said construction comprising a pair of rotary solenoids, each solenoid having a stationary ferro-magnetic core having a straight passage therethrough and having outer surfaces circularly symmetrical with respect to the axis of said passage, an annular magnetizing winding for each core, a generally cup-shaped member around each winding, said cup-shaped members being ferro-magnetic and having the bottom portion of the cup apertured, a cylindrical armature within each cup aperture, said armature being movable inwardly of the cup toward the core upon energization of the corresponding winding, means for mounting said pair of solenoids so that the various parts are in aligned relation with the armatures moving in opposite directions axially of the construction, a shaft passing through the two armatures and cores, said shaft being loose, a driving member for each armature, a driven member for each armature, said driving and driven members being outside of the cup-shaped members, each driven member being between the corresponding driving member and the outer surface of the bottom of the corresponding cup member, means cooperating with said opposed surfaces of the cup and driven member for guiding each driven member along a helical path coaxial with the shaft, each driven member being adapted to approach the cup as it turns in one direction and to move away from the cup in the reverse direction, said two driving members turning in opposite directions on approaching their respective cups, means for biasing each driven member to a normal position away from the cup, and means for coupling the shaft to each driving member, said coupling means rotatively locking said shaft to said two driving members but permitting relative longitudinal movement of said driving members and armatures with respect to said shaft whereby said shaft may be oscillated without substantial longitudinal movement, each armature when moving in response to solenoid energization urging said driving member against the driven member to create a driving connection between the two.

3. The construction according to claim 2 wherein each armature is provided with a spring means for exerting a slight bias upon said armature longitudinally of said shaft in a direction to create a light pressure of the driving member upon the driven member, each armature upon energization of its solenoid unit increasing this light pressure to a heavy driving pressure.

4. The construction according to claim 3 wherein friction pads are provided between the driving and driven members.

References Cited in the file of this patent

UNITED STATES PATENTS 2,566,571   Leland _____ Sept. 4, 1951